United States Patent [19]
Trenkamp et al.

[11] Patent Number: 5,330,114
[45] Date of Patent: Jul. 19, 1994

[54] SHREDDER ATTACHMENT FOR COMBINE CORN HEAD

[76] Inventors: Michael J. Trenkamp, 610½ 2nd Ave. SE.; Loras F. Gravel, 31406 Hickory, both of Dyersville, Iowa 52040

[21] Appl. No.: 68,182

[22] Filed: May 28, 1993

[51] Int. Cl.⁵ .......................................... A01D 45/10
[52] U.S. Cl. ...................... 241/101.7; 56/2; 56/60
[58] Field of Search ............. 241/101.7; 56/295, 60, 56/14.3, 2, 157

[56] References Cited

U.S. PATENT DOCUMENTS

| | | | |
|---|---|---|---|
| 3,984,966 | 10/1976 | Outtier | 56/10.2 |
| 4,383,536 | 5/1983 | Delorme | 130/27 R |
| 4,539,799 | 9/1985 | Kalverkamp | 56/60 |
| 4,864,807 | 9/1989 | Ostrup et al. | 56/60 |
| 5,009,061 | 4/1991 | Heuling | 56/104 |
| 5,157,904 | 10/1992 | Otten et al. | 56/60 X |

*Primary Examiner*—Douglas D. Watts
*Attorney, Agent, or Firm*—Jacobson, Price, Holman & Stern

[57] ABSTRACT

An attachment for a combine and more specifically to a shredder attachment for a combine corn head to shred or chop corn stalks as they pass downwardly through the feed rolls on a combine corn head with the shredded materials being discharged onto the ground surface. The shredder attachment includes a plurality of cutter assemblies each including a pair of rotary cutter bars each in the form of a circular disk or plate having flat cutter blades attached thereto at the periphery with the rotary cutter plates in each cutter assembly being driven in opposite directions with the cutter bar blades overlapping the row of stalks by several inches to assure complete shredding action. The cutter assemblies are each driven by a hydraulic motor and a spur gear drive train oriented in a gear box with the spur gears running in oil. Hydraulic pressure is provided to the hydraulic motor from a pump assembly that is belt driven from a cross shaft on the combine head. The pump assembly includes a pump associated with a supply reservoir and conduits associated with the hydraulic motors. The cutter assemblies are supported from a transverse frame member extending transversely of the corn head in underlying relation to the feed rolls and associated components of the corn head.

8 Claims, 3 Drawing Sheets

SHREDDER ATTACHMENT FOR COMBINE CORN HEAD

BACKGROUND OF THE INVENTION

1. Field of the Invention

The present invention generally relates to an attachment for a combine and more specifically to a shredder attachment for a combine corn head to shred or chop corn stalks as they pass downwardly through the feed rolls on a combine corn head with the shredded materials being discharged onto the ground surface. The shredder attachment includes a plurality of cutter assemblies each including a pair of rotary cutter bars each in the form of a circular disk or plate having flat cutter blades attached thereto at the periphery with the rotary cutter plates in each cutter assembly being driven in opposite directions with the cutter bar blades overlapping the row of stalks by several inches to assure complete shredding action. The cutter assemblies are each driven by a hydraulic motor and a spur gear drive train oriented in a gear box with the spur gears running in oil. Hydraulic pressure is provided to the hydraulic motor from a pump assembly that is belt driven from a cross shaft on the combine head. The pump assembly includes a pump associated with a supply reservoir and conduits associated with the hydraulic motors. The cutter assemblies are supported from a transverse frame member extending transversely of the corn head in underlying relation to the feed rolls and associated components of the corn head.

2. Description of the Prior Art

Various devices have been provided on combines for shredding, chopping or spreading plant stalks, stems, straw, hay and the like which utilize cutter assemblies including rotary cutting elements driven mechanically or hydraulically. The following U.S. patents are relevant to this field of endeavor.

U.S. Pat. No. 3,984,966
U.S. Pat. No. 4,383,536
U.S. Pat. No. 4,539,799
U.S. Pat. No. 4,864,807
U.S. Pat. No. 5,009,061

While the above patents include stalk cutting assemblies associated with a combine and other devices of a similar nature, the prior art does not disclose the specific structure in association of the structure with a combine corn head that is incorporated into the above invention.

SUMMARY OF THE INVENTION

An object of the present invention is to provide a shredder attachment for the corn head of a combine for shredding corn stalks as they pass between the feed rolls on the corn head of the combine with the shredded material being discharged onto the ground surface.

Another object of the invention is to provide a shredder attachment in the form of a plurality of cutter assemblies spaced laterally from each other and supported from the corn head in underlying but adjacent relation to the feed rolls with each cutter assembly including a pair of rotatably driven cutter bars with each cutter bar including a circular plate or disk having a plurality of cutter blades mounted on the periphery thereof and extending radially outwardly from the periphery with the cutter blades overlapping the row of corn stalks to effectively shred the corn stalks in a row as they pass between the feed rolls.

A further object of the invention is to provide a shredder attachment in accordance with the preceding objects in which each cutter assembly is provided with a hydraulic drive motor for driving the pair of rotary cutter bars in opposite directions through a spur gear drive train enclosed within a gear box or casing receiving a quantity of lubricating oil in which the gears rotate.

Still another object of the invention is to provide a shredder attachment in accordance with the preceding objects in which the hydraulic motor for each cutter assembly is driven from a hydraulic pump and reservoir assembly supported from the corn head and driven from a cross shaft on the corn head.

A still further object of the invention is to provide a shredder attachment for the corn head of the combine as set forth in the preceding objects in which each cutter assembly is supported by a bracket attached to a transverse frame member oriented in underlying relation to the corn head with the cutter assemblies being disposed below the feed rolls with the cutter blades extending into the space between the feed rolls for effective shredding contact with corn stalks passing between the feed rolls.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
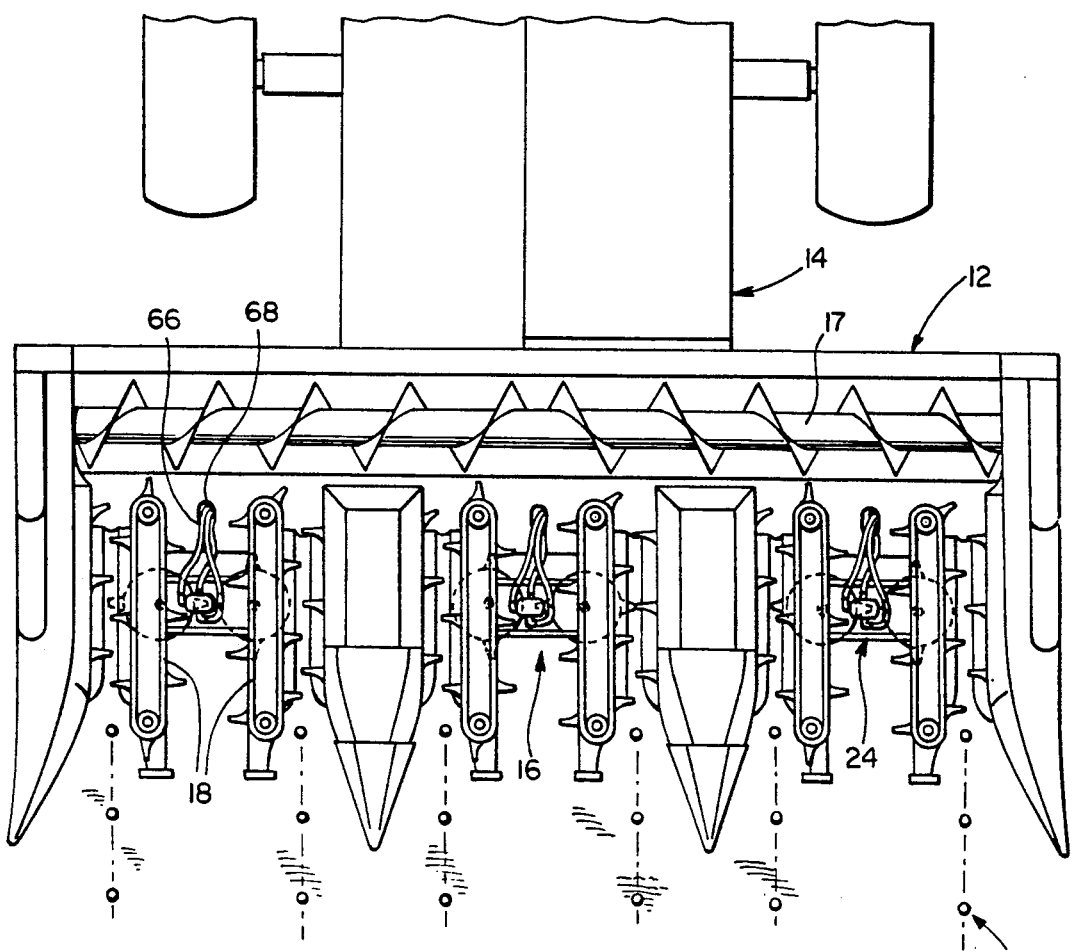
FIG. 1 is a schematic plan view of a combine corn head with parts removed and the shredder attachment of the present invention mounted thereon.
Figure 2:
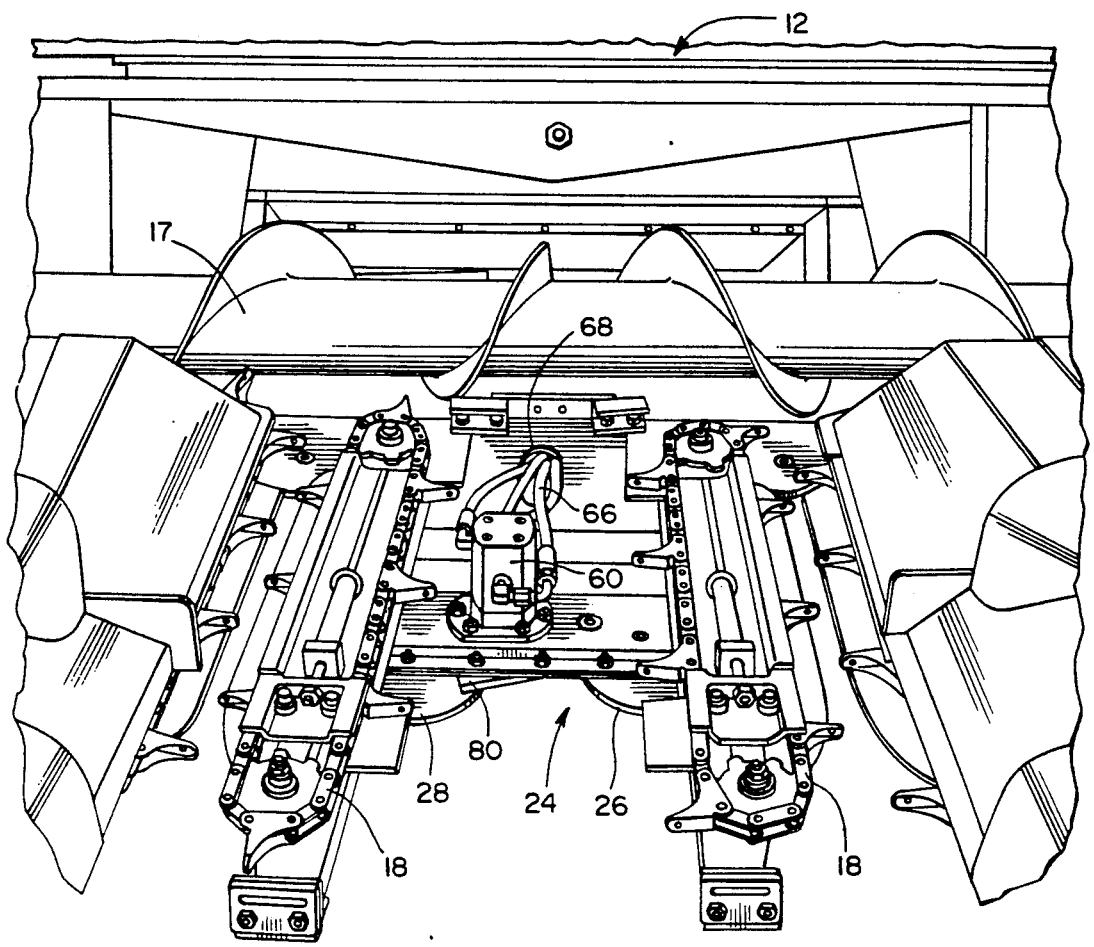
FIG. 2 is an enlarged perspective view of one of the cutter assemblies with portions of the corn head removed for clarity.
Figure 3:
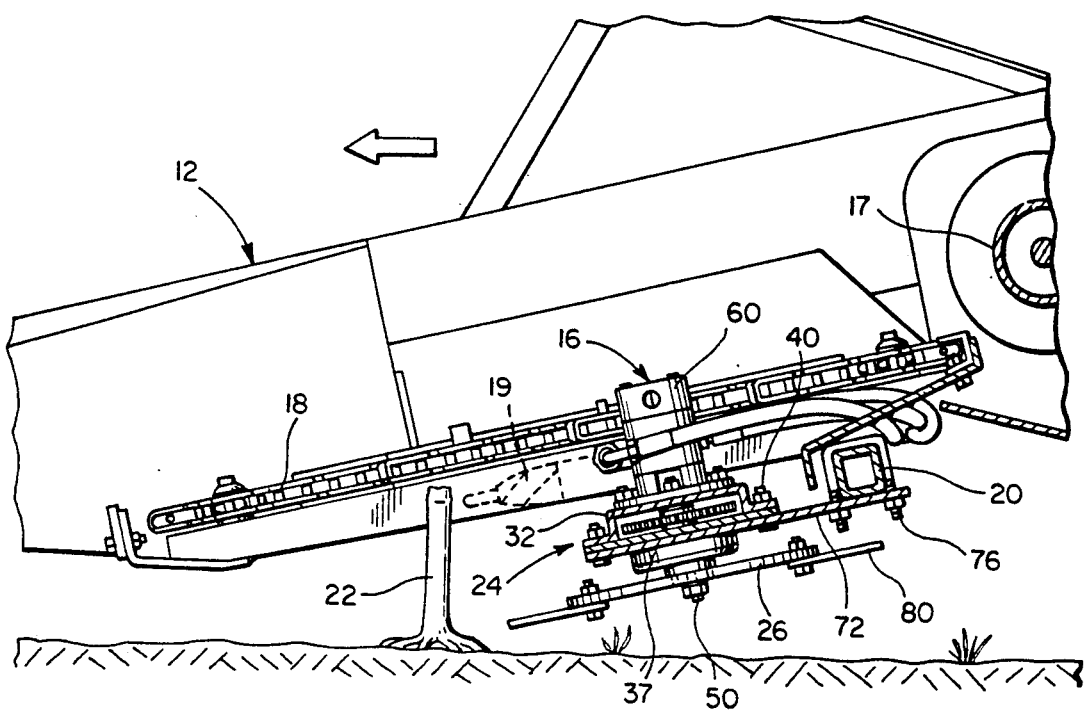
FIG. 3 is a longitudinal sectional view illustrating the relationship of the shredder attachment to the combine corn head.
Figure 4:
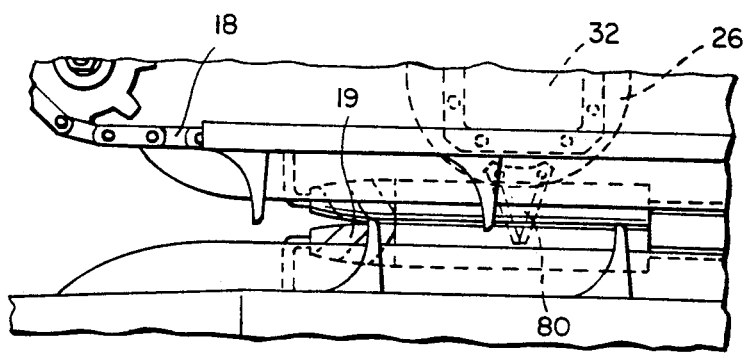
FIG. 4 is an enlarged fragmental plan view illustrating the association of the shredder attachment to the corn head.
Figure 7:
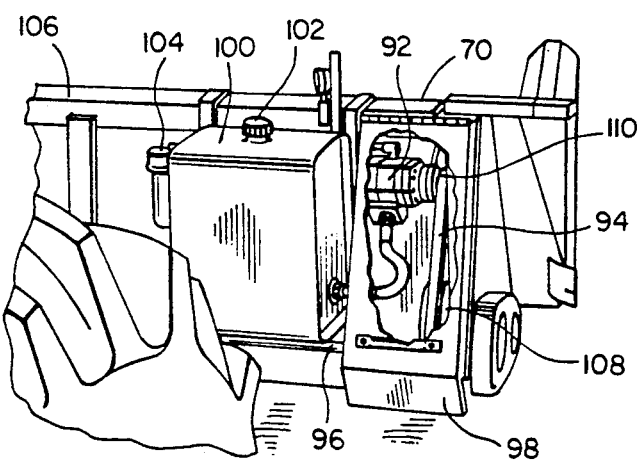
FIG. 7 is a fragmental perspective view with portions broken away illustrating the hydraulic pump, reservoir and belt drive for the pump to supply hydraulic pressure to the cutter assemblies.

As illustrated in FIGS. 1-3 of the drawings, a corn head 12 and combine 14 are illustrated in order to show the relationship of the shredder attachment 16 of the present invention associated therewith. The gathering points normally provided on the corn head have been removed in the drawings to enable better observation of the shredder attachment and its relationship to the feed rolls, husking rolls and other components of the corn head. The corn head 12 includes a rear transverse auger structure 17, gathering chains 18 having projecting lugs thereon and feed rolls 19 supported from a framework 20 and driven from the combine along with other components of the corn head in a conventional manner. As illustrated in FIG. 3, the shredding attachment 16 is rigidly clamped to a transverse frame member 20 which is an existing frame member forming part of the corn head. The shredding attachment 16 is adapted to shred corn stalks 22 oriented in aligned rows as illustrated schematically in FIG. 1 as the corn stalk moves between the feeding rolls and other components of the corn head.

Figure 5:
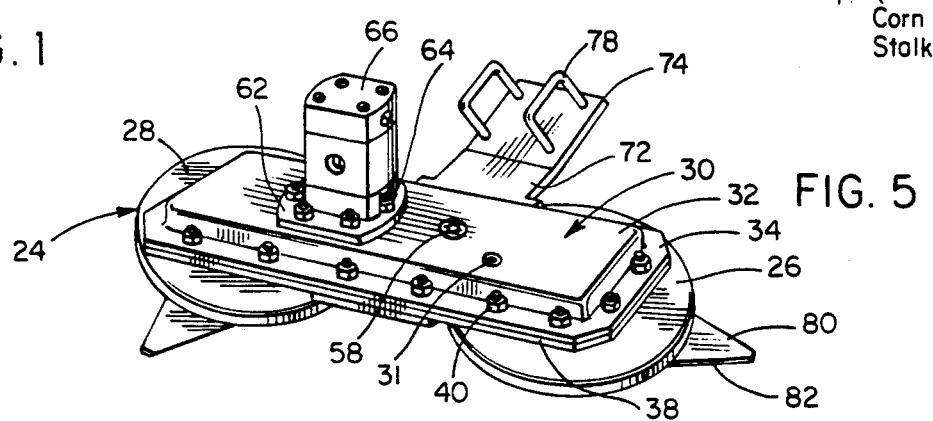
FIG. 5 is a perspective view of one of the cutter assemblies of the shredder attachment.
Figure 6:
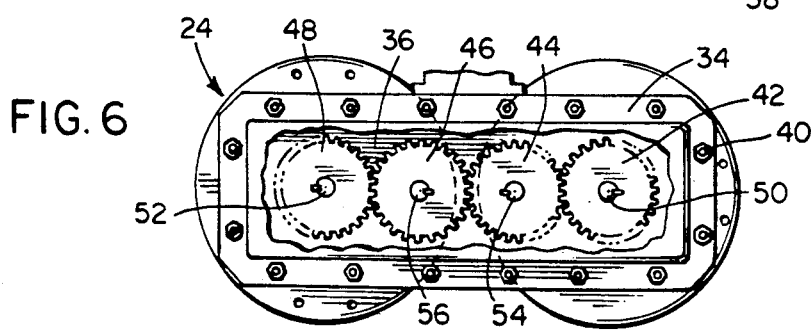
FIG. 6 is a plan view of the cutter assembly with a portion of the gear box broken away illustrating the spur gear drive train.

The shredding attachment includes a plurality of cutter assemblies 24 which are oriented in laterally spaced relation on the corn head and oriented below the feed rolls. As illustrated in FIGS. 5 and 6, each cutter assembly includes a pair of circular cutter plates 26 and 28 rotatably supported below a gear box or casing generally designated by reference numeral 30 with the gear box including a top plate 32 having an offset peripheral flange 34 and a lower plate 36 having downwardly offset portions 37 and a flange 38 with the flanges being secured together by a plurality of bolts 40. The flanges 34 and 38 are sealed in relation to each other to form an enclosed gear box receiving meshing spur gears 42, 44, 46 and 48. The outermost gears 42 and 48 are keyed to shafts 50 and 52 respectively which are rigidly connected to the circular plates 26 and 28 respectively with the shafts being sealed where they go through the lower plate 36 of the gear box 30. The two innermost spur gears 44 and 46 are meshed with the gears 42 and 48 and with each other. The gears 44 and 46 are keyed to shafts 54 and 56 respectively with the shaft 54 being journaled in a bearing and seal 58 and the shaft 56 being connected with and forming an extension of the output power shaft of a hydraulic motor 60. The motor 60 includes a flange 62 at the bottom end of its housing which is secured to the gear box by suitable bolts 64. With this construction, the gear box 30 will retain a quantity of lubricating oil, placed therein through a filler 31, in order for the spur gears to run in a bath of lubricating oil. The hydraulic motor is connected with supply and return hoses 66 that are connected with inlets and outlets of the motor 60 and extend through openings 68 in a component of the corn head and connect with a hydraulic pump and reservoir assembly generally designated by reference numeral 70.

Each of the cutter assemblies 24 includes a central supporting bracket 72 in the form of a plate that is secured to the underside of the bottom plate 36 by the flange bolts 40 with an end portion 74 of the bracket 72 extending in underlying relation to the frame member 20. A pair of U-bolts 76 rigidly, fixedly and adjustably secure the bracket 72 to the frame member 20 with the plane of the blades or disks 26 and 28 tipped downwardly as illustrated in FIG. 2.

Figure 8:
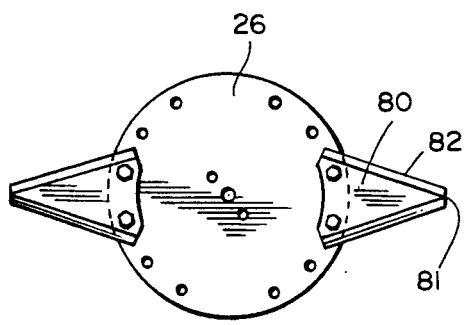
FIGS. 8, 9 and 10 are fragmental plan views of optional cutter blades attached to the rotatably driven circular plate forming a portion of each cutter bar.
Figure 9:
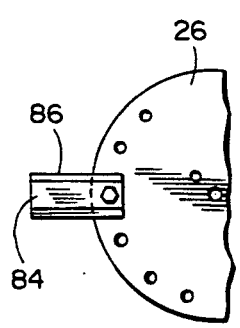
Figure 10:
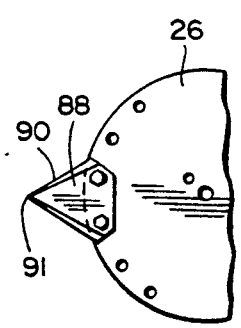

FIG. 8 illustrates the rotatably driven circular plate or disk 26 which forms a cutter bar and includes a pair of diametrically opposed cutter blades 80 mounted thereon which, in FIG. 8, are generally V-shaped in configuration and provided with a flat end 81 and sharpened bevelled outwardly converging edges 82. FIG. 9 illustrates another embodiment of the circular plate 26 with a generally rectangular cutter blade 84 connected thereto with the opposite edges being bevelled or sharpened at 86. FIG. 10 illustrates another embodiment of the circular plate 26 with cutter blade 88 attached thereto which are also V-shaped but have cutting edges 90 that converge to a sharp point 91 rather than a blunt outer end as in FIG. 8. As illustrated, the cutter blades may be secured in place by a pair of bolts or a single central bolt with the cutter blades being precluded from rotation by a pair of small drive tabs which keep the blade rotating with the plate but serve as a safety device to permit the blades to pivot should the blades strike an unusually hard object.

The pump and reservoir assembly 70 includes a hydraulic pump 92 driven by a drive belt 94 which is drivingly connected to a cross shaft 96 on the corn head 12 with belt guards 98 being provided for the drive belts to the hydraulic pump 92. The pump 92 is communicated with a reservoir 100 having a filler cap 102 and a filter assembly 104 associated therewith with these components being supported from a transverse frame member 106 at the rear of the corn head 12. The pump and motors as well as the reservoir, filter and pressure limiting and control devices are conventional and standard components providing sufficient capacity to drive the hydraulic motors with a high level of efficiency and a satisfactory overload safety factor with the single pump providing adequate pressure and volume of hydraulic pressure to drive the motors which, as illustrated, involve the use of up to 6 motors in the shredding attachment. The drive power for the pump 92 is received from the cross shaft 96 on the combine head with a pulley 108 having a relatively large diameter mounted thereon with the pulley preferably being a three groove pulley or sheave. This pulley drives a smaller pulley 110 through a belt and belt tensioner which in turn drives the pump 92 with the pulley 110 or sheave on the pump shaft being about ¼ the diameter of the pulley 108 on the cross shaft 96. Suitable brackets are provided for the pump, reservoir and belt protective covers 98. The hydraulic motors are connected with the pump by hydraulic hoses 66 of a size sufficient to supply each of the motors with sufficient pressure and volume of hydraulic fluid to properly operate the motors 60 and return to the reservoir 100.

Different cutter bars may be used for wider and narrower row spacings depending upon the spacing of the corn row stalks with up to three cutter assemblies being provided with the three motors being driven from a single hydraulic pump with each motor having an internal bypass which prevents hydraulic spikes between the motors should one motor become momentarily stalled. The supply hoses are slightly larger than the return hoses and the return oil is returned through the filter along with any hydraulic oil from the casing drain mounted on each motor. The cutter bars are mounted near the rear of the feed rolls such that the corn stalk is cut and shredded as it passes downwardly through the rolls with the frequency of cut depending upon the ground speed and the speed of the feed rolls and cross shaft with the cutter bar blades overlapping the corn stalk row by approximately 2 to 3 inches to assure that all stalks are shredded. The cutter bar circular plates 26 and 28 are slightly tipped relative to the feed rolls to keep the blades and cutter bar spaced above the ground as much as possible.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A shredder attachment for the corn head of a combine comprising at least one cutter assembly mounted in underlying relation to gathering chains and feed rolls on a combine corn head which are adapted to receive rows of corn stalks therebetween, said cutter assembly including means mounting the cutter assembly from the corn head below and at the rear of the feed rolls for orienting the cutter assembly adjacent the path of movement of rows of corn stalks passing downwardly and rearwardly between the gathering chains and feed rolls as the combine moves forwardly, said cutter assembly including a pair of rotatable cutter bars, each cutter bar being in the form of a circular plate, at least one radially extending cutting blade mounted on a periphery of each circular plate with the blades overlapping the rows of corn stalks to shred the corn stalks as they pass between the gathering chains and feed rolls and means driving said circular plates to shred the corn stalks passing therebetween, said means driving the rotatable plates including a hydraulic motor, a gear box supporting said motor, said gear box including a bracket forming the means supporting the cutter assembly from the corn head of the combine, said gear box including a meshed gear drive train therein having one of said gears driven by said motor, each of the circular plates having a shaft connected with another of said gears with the drive train rotating the circular plates in opposite directions.

2. The shredder attachment as defined in claim 1 wherein said gear box is sealed and provided with a quantity of lubricating oil whereby the gears run in an oil bath.

3. The shredder attachment as defined in claim 1 wherein each of said rotatable plates includes a pair of diametrically opposed cutter blades with the cutter blades including sharpened edges extending outwardly from the periphery of the circular plates.

4. The shredder attachment as defined in claim 1 together with additional cutter assemblies supported in laterally spaced relation from said corn head of the combine to enable shredding of additional rows of corn stalks.

5. A shredder attachment for the corn head of a combine comprising at least one cutter assembly mounted in underlying relation to gathering chains and feed rolls on a combine corn head which are adapted to receive rows of corn stalks therebetween, said cutter assembly including means mounting the cutter assembly from the corn head below and at the rear of the feed rolls for orienting the cutter assembly adjacent the path of movement of rows of corn stalks passing downwardly and rearwardly between the gathering chains and feed rolls as the combine moves forwardly, said cutter assembly including a pair of rotatable cutter bars, each cutter bar being in the form of a circular plate, at least one radially extending cutting blade mounted on a periphery of each circular plate with the blades overlapping the rows of corn stalks to shred the corn stalks as they pass between the gathering chains and feed rolls and means driving said circular plates to shred the corn stalks passing therebetween, said means mounting the cutter assembly from the corn head including a bracket extending rearwardly therefrom, said corn head including a transverse frame member, said bracket being attached to said frame member in a positive, rigid and laterally adjustable manner for positioning the cutter assembly in desired position.

6. The shredder attachment as defined in claim 1 wherein said means driving the cutter bar includes a hydraulic motor, a hydraulic pump mounted on the corn head and provided with a reservoir and hoses communicating the pump, reservoir and hydraulic motor, said pump including drive means connected with a cross shaft on the corn head of the combine.

7. In combination with the corn head of a combine including a plurality of pairs of gathering chains and feed rolls with the combine corn head also including a powered cross shaft and a transverse frame member, a plurality of cutter assemblies mounted on the corn head in underlying relation to the gathering chains and feed rolls, means supporting the cutter assemblies from said transverse frame member to support the cutter assemblies in adjacent relation to paths of movement rows of corn stalks passing rearwardly and downwardly between the gathering chains and feed rollers as the combine moves forwardly, means driving said cutter assemblies and receiving power from said cross shaft, each of the cutter assemblies including a rotatably supported and rotatably driven cutter plate oriented alongside the path of movement of a row of corn stalks, each plate including outwardly extending blades extending from a periphery thereof with the blades extending into the path of a row of corn stalks for shredding the corn stalks throughout their length and discharging the shredded corn stalks onto the ground surface as they pass rearwardly and downwardly between the gathering chains and feed rollers.

8. The combination as defined in claim 7 wherein each of the cutter assemblies includes a pair of rotatable circular plates, a hydraulic motor for driving the rotatable plates, a gear box supporting said motor and enclosing a gear train interconnecting the hydraulic motor and the rotatable circular plates, a pump, reservoir and hoses associated with the hydraulic motors to drive the cutter assemblies with the pump and reservoir being supported from said corn head and said pump including drive means connected to said cross shaft.

* * * * *